(12) United States Patent
Barrow

(10) Patent No.: US 7,684,817 B2
(45) Date of Patent: Mar. 23, 2010

(54) WIRELESS COMMUNICATION SYSTEM HAVING A SIGNALING GATEWAY SERVING AS AN INTERMEDIARY BETWEEN A DISPATCH CALL CONTROLLER AND A BASE STATION

(75) Inventor: Steven Wesley Barrow, South Riding, VA (US)

(73) Assignee: Nextel Communications Inc., Reston, VA (US)

(*) Notice: Subject to any disclaimer, the term of this patent is extended or adjusted under 35 U.S.C. 154(b) by 366 days.

(21) Appl. No.: 11/193,208

(22) Filed: Jul. 28, 2005

(65) Prior Publication Data

US 2006/0058068 A1 Mar. 16, 2006

Related U.S. Application Data

(60) Provisional application No. 60/608,909, filed on Sep. 13, 2004.

(51) Int. Cl.
*H04B 7/00* (2006.01)

(52) U.S. Cl. .................. 455/521; 455/518; 455/519

(58) Field of Classification Search .......... 455/507, 455/517–521
See application file for complete search history.

(56) References Cited

U.S. PATENT DOCUMENTS

| | | | | |
|---|---|---|---|---|
| 5,530,693 A * | 6/1996 | Averbuch et al. | ............ | 370/331 |
| 5,548,631 A * | 8/1996 | Krebs et al. | ............ | 455/426.1 |
| 6,141,683 A | 10/2000 | Kraml et al. | | |
| 6,178,337 B1 * | 1/2001 | Spartz et al. | ............ | 455/561 |
| 6,449,257 B1 * | 9/2002 | Choi | ............ | 370/242 |
| 6,640,109 B1 * | 10/2003 | Drozt et al. | ............ | 455/508 |
| 7,089,012 B2 * | 8/2006 | Harris et al. | ............ | 455/445 |
| 2003/0012155 A1 * | 1/2003 | Sayeedi | ............ | 370/328 |
| 2003/0081622 A1 * | 5/2003 | Jeong | ............ | 370/401 |
| 2003/0207690 A1 * | 11/2003 | Dorenbosch | ............ | 455/445 |
| 2004/0127233 A1 * | 7/2004 | Harris et al. | ............ | 455/458 |
| 2004/0203793 A1 * | 10/2004 | Dorenbosch | ............ | 455/445 |
| 2005/0054348 A1 * | 3/2005 | Turina et al. | ............ | 455/453 |
| 2005/0124367 A1 * | 6/2005 | Hassan et al. | ............ | 455/518 |
| 2005/0185656 A1 * | 8/2005 | Svensson et al. | ............ | 370/398 |
| 2005/0243758 A1 * | 11/2005 | Torarp et al. | ............ | 370/328 |

FOREIGN PATENT DOCUMENTS

EP 1191803 A1 * 3/2002

OTHER PUBLICATIONS

Written Opinion of the International Searching Authority in PCT/US05/32951 dated Sep. 11, 2006.

(Continued)

*Primary Examiner*—Raymond S Dean

(57) ABSTRACT

A wireless communication system including dispatch call controllers, signaling gateways, base stations, a first network coupling the dispatch call controllers to the signaling gateways, and a second network coupling the signaling gateways to the base stations. The signaling gateways serve as intermediaries between dispatch call controllers and base stations by translating messages received from dispatch call controllers intended for the base stations from the protocol used in the first communications network to the protocol used in the second communications network, and translating messages received from base stations intended for dispatch call controllers from the protocol used in the second communications network to the protocol used in the first communications network. The system may be configured such that each dispatch call controller has individual logical links to each of the signaling gateways, and each signaling gateway has logical links to a distinct subset of the base stations.

12 Claims, 9 Drawing Sheets

OTHER PUBLICATIONS

International Search Report in PCT/US05/32951 dated Sep. 11, 2006.

International Preliminary Report on Patentability and Written Opinion for PCT/US2005/032951 dated Mar. 13, 2007.

* cited by examiner

US 7,684,817 B2

WIRELESS COMMUNICATION SYSTEM HAVING A SIGNALING GATEWAY SERVING AS AN INTERMEDIARY BETWEEN A DISPATCH CALL CONTROLLER AND A BASE STATION

CROSS-REFERENCE TO A RELATED APPLICATION

This application claims the benefit of the filing date of Provisional Application Ser. No. 60/608,909, filed on Sep. 13, 2004, and entitled "Dispatch Call Controller Link State Management via Point-to-Point Links," which is herein incorporated by reference.

FIELD OF THE INVENTION

This invention relates generally to wireless communication systems, and in particular, to a wireless communication system characterized in having dispatch call controllers coupled to base stations (cell sites) by way of respective signaling gateways.

BACKGROUND OF THE INVENTION

Wireless communication systems allow users to communicate with other entities while allowing them to be geographically mobile. Also, today's wireless communication systems allow users to communicate with other entities in a variety of different communication modes. For example, some wireless communication systems allow users to communicate with each other in interconnect (cellular) mode, where the communication link is full-duplex, allowing all parties to transmit simultaneously. Other, or the same, wireless communication systems allow users to communicate with each other in dispatch mode (walkie-talkie mode), where the communication link is half-duplex, only allowing a single party to transmit at a particular time.

A typical wireless communication system providing dispatch communication services generally includes one or more dispatch call controllers, one or more voice packet duplicators, and a plurality of base stations (cell sites) all coupled together by way of a communications network. As discussed in more detail below, the dispatch call controllers generate messages for setting up dispatch communication links, controlling the channel floors of the dispatch communication links, and terminating the dispatch communication links. In addition, the dispatch call controller is also involved in managing the mobility of mobile communication units (MUs) from base station to base station. The voice packet duplicators generate voice packets for transmission via the established dispatch communication links. The base stations provide an interface between a wireless environment in which the MUs reside, and the wired environment of the communications network. The following illustrates an example of a conventional dispatch wireless communication system.

FIG. 1A illustrates a block diagram of a conventional wireless communication system 100. The wireless communication system 100 includes a plurality of dispatch call controllers 102-1 through 102-$m$, a frame relay/asynchronous transfer mode (ATM) communications network 104, and a plurality of base stations 106-1 through 106-$n$. The dispatch call controllers 102-1 through 102-$m$ and the base stations 106-1 through 106-$n$ communicate with each other by way of the frame relay/ATM communications network 104. The wireless communication system 100 provides dispatch communication services to a plurality of MUs, two of which are shown as MUs 108-1 and 108-2 assigned respectively to base stations 106-1 and 106-6. The following describes an exemplary process performed by a dispatch call controller in setting up a dispatch communication link, controlling the channel floor, and terminating the dispatch communication link.

In this example, the user of MU 108-1 desires to communicate with the user of MU 108-2 in dispatch communication mode. First, in response to the user of MU 108-1 initiating a dispatch call by selecting the target MU 108-2 and pressing an appropriate button, the MU 108-1 sends a page request targeting MU 108-2 to, for example, dispatch call controller 102-1 by way of base station 106-1 and the frame relay/ATM network 104. In response to receiving the page request, the dispatch call controller 102-1 sends a paging message to the MU 108-2 by way of the frame relay/ATM network 104 and base station 106-6. If MU 108-2 does not respond within a predetermined time interval (meaning that it may not be available), the dispatch call controller 102-1 sends a target unavailable message to the originator MU 108-1 by way of the frame relay/ATM network 104 and base station 106-1. If, on the other hand, the target MU 108-2 is available, it sends a page response to the dispatch call controller 102-1 by way of the base station 106-6 and frame relay/ATM network 104.

In response to receiving the page response from the target MU 108-2, the dispatch call controller 102-1 sends a target available message to the originator MU 108-1 by way of the frame relay/ATM network 104 and base station 106-1, and proceeds to establish the dispatch communication link between the originator and target MUs 108-1 and 108-2. During the dispatch communication call, the dispatch call controller 102-1 initially receives a channel floor request from the originator MU 108-1 by way of the base station 106-1 and frame relay/ATM network 104. The channel floor request informs the dispatch call controller 102-1 that MU 108-1 desires the channel floor to transmit a voice communication to the target MU 108-2. In response to the floor request, the dispatch call controller 102-1 allocates the floor to only the originator MU 108-1. If during the time that the originator MU 108-1 has the channel floor, the target MU 108-2 sends a channel floor request to the dispatch call controller 102-1 by way of the base station 106-6 and frame relay/ATM network 104, the dispatch call controller 102-1 sends a channel floor deny message to the target MU 108-2 by way of the frame relay/ATM network 104 and base station 106-6.

When the originator MU 108-1 completes sending the voice communication, it sends a channel floor open request to the dispatch call controller 102-1 by way of the base station 106-1 and frame relay/ATM network 104. In response to the channel floor open request, the dispatch call controller 102-1 makes the channel floor available until it receives another channel floor request. If no channel floor request is received within a predetermined hang time interval, the dispatch call controller 102-1 terminates the dispatch communication link, and sends appropriate messages to the originator MU 108-1 and target MU 108-2 via the frame relay/ATM network 104 and the respective base stations 106-1 and 106-6.

In addition to setting up dispatch communication links, controlling the respective channel floors, and terminating dispatch communication links, the dispatch call controllers also manages the mobility of MUs between different base stations. For example, if MU 108-1 detects that the RF environment to base station 106-2 is better than the RF environment of its assigned base station 106-1, the MU 108-1 may send a handover request to the dispatch call controller 102-1 by way of base station 106-1 and frame relay/ATM network 104. In response to the handover request, the dispatch call controller 102-1 may send a handover grant message to the MU 108-1 and base stations 106-1 and 106-2. The dispatch call controller 102-1 may also update a home location register (HLR) (not shown) and/or visitor location register (VLR) (not shown) to denote the new assigned base station 106-2 for MU 106-1.

As exemplified above, dispatch call controllers use the frame relay/ATM network 104 to communicate with base stations to establish, control, and terminate dispatch communications links, and also to manage the mobility of MUs between different base stations. As discussed in more detail below, the frame relay/ATM network 104 is configured to form a plurality of logical links connecting each of the dispatch call controllers to each of the base stations. Each of the dispatch call controllers has to manage its own set of logical links to the base stations. This is further explained below with reference to the following example.

FIG. 1B illustrates a link diagram of the prior art wireless communication system 100. As discussed above, the wireless communication system 100 includes the plurality of dispatch call controllers 102-1 through **102-*m*, and the plurality of base stations 106-1 through 106-*n*. As discussed above, the frame relay/ATM network 104 is configured to couple each of the dispatch call controllers to each of the base stations by way of individual logical links. Accordingly, dispatch call controller 102-1 is coupled to base stations 106-1 and 106-*n* by way of respective logical links 110-1-1 through 110-1-*n* of the frame relay/ATM network 104. Similarly, dispatch call controller 102-2 is coupled to base stations 106-1 and 106-*n* by way of respective logical links 110-2-1 through 110-2-*n* of the frame relay/ATM network 104. And likewise, dispatch call controller 102-*m* is coupled to base stations 106-1 and 106-*n* by way of respective logical links 110-*m*-1 through 110-*m*-*n* of the frame relay/ATM network 104**.

In a particular wireless communication system, there may be 15 dispatch call controllers (m=15) and 3200 base stations (n=3200). In such a system, there would be 48,000 logical links connecting the dispatch call controllers to the base stations (i.e., 15 dispatch call controllers×3200 base stations). Accordingly, the dispatch call controllers have to track and manage the state of 48,000 logical links. Such tracking and management of logical links consume substantial amount of processing power of the dispatch call controllers. Additionally, when a link goes down for any reason, the dispatch call controller attempts to periodically reestablish connectivity via the link. This further results in additional consumption of processing power of the dispatch call controllers. Furthermore, the large amount of logical links makes it relatively difficult to troubleshoot problems within the frame relay/ATM network.

SUMMARY OF THE INVENTION

An aspect of the invention relates to a wireless communication system comprising a plurality of dispatch call controllers, a plurality of signaling gateways, a plurality of base stations, a first communications network coupling the dispatch call controllers to the signaling gateways, and a second communications network coupling the signaling gateways to the base stations. The signaling gateways serve as intermediaries between dispatch call controllers and base stations by translating messages received from dispatch call controllers intended for the base stations from the protocol used in the first communications network to the protocol used in the second communications network; and translating messages received from base stations intended for dispatch call controllers from the protocol used in the second communications network to the protocol used in the first communications network.

The wireless communication system may be configured such that each dispatch call controller has a logical link to each of the signaling gateway by way of the first communications network. In addition, the wireless communication system may be configured such that each signaling gateway has logical links to a distinct subset of the base stations. With this configuration, the number of logical links to be managed in the wireless communication system is substantially reduced. For example, in the case of 15 dispatch call controllers and 3200 base stations, the number of logical links managed by the new wireless communication system is 4700 as oppose to 48,000 required by the prior art wireless communication system.

Another aspect of the invention relates to a dispatch call controller, comprising a network interface, and a processor adapted to determine a mobile unit to which a message is to be sent; determine a selected base station among a plurality of base stations assigned to communicate with the mobile unit; determine a selected signaling gateway among a plurality of signaling gateways that communicates with the selected base station; determine the software version used by the selected base station in performing its operation; determine the status of the logical link to the selected base station; and send the message to the selected signaling gateway by way of the network interface if the status of the logical link to the selected base station is active. A method and computer readable medium including one or more software modules related to the operation of the dispatch call controller are also disclosed.

Yet another aspect of the invention relates to a signaling gateway, comprising a first network interface adapted to couple to a first communications network, a second network interface adapted to couple to a second communications network, and a processor. The processor is adapted to receive a first message from a dispatch call controller by way of the first network interface; re-format the first message for transmission to a base station by way of the second communications network; and send the re-formatted first message to the base station by way of the second network interface. The processor is also adapted to receive a second message from the base station by way of the second network interface; re-format the second message for transmission to the dispatch call controller by way of the first communications network; and send the second message to the dispatch call controller by way of the first network interface. Also, the processor is adapted to ascertain the status of the logical link to the base station, and send a message related to the logical link status to the dispatch call controller by way of the first network interface. Additionally, the processor is adapted to ascertain the software version used by the base station in performing its operation, and send a message related to the software version to the dispatch call controller by way of the first network interface. A method and computer readable medium including one or more software modules related to the operation of the signaling gateway are also disclosed.

Other aspects, features, and techniques of the invention will be apparent to one skilled in the relevant art in view of the following detailed description of the exemplary embodiments of the invention.

DETAILED DESCRIPTION OF THE EXEMPLARY EMBODIMENTS

Figure 1A:
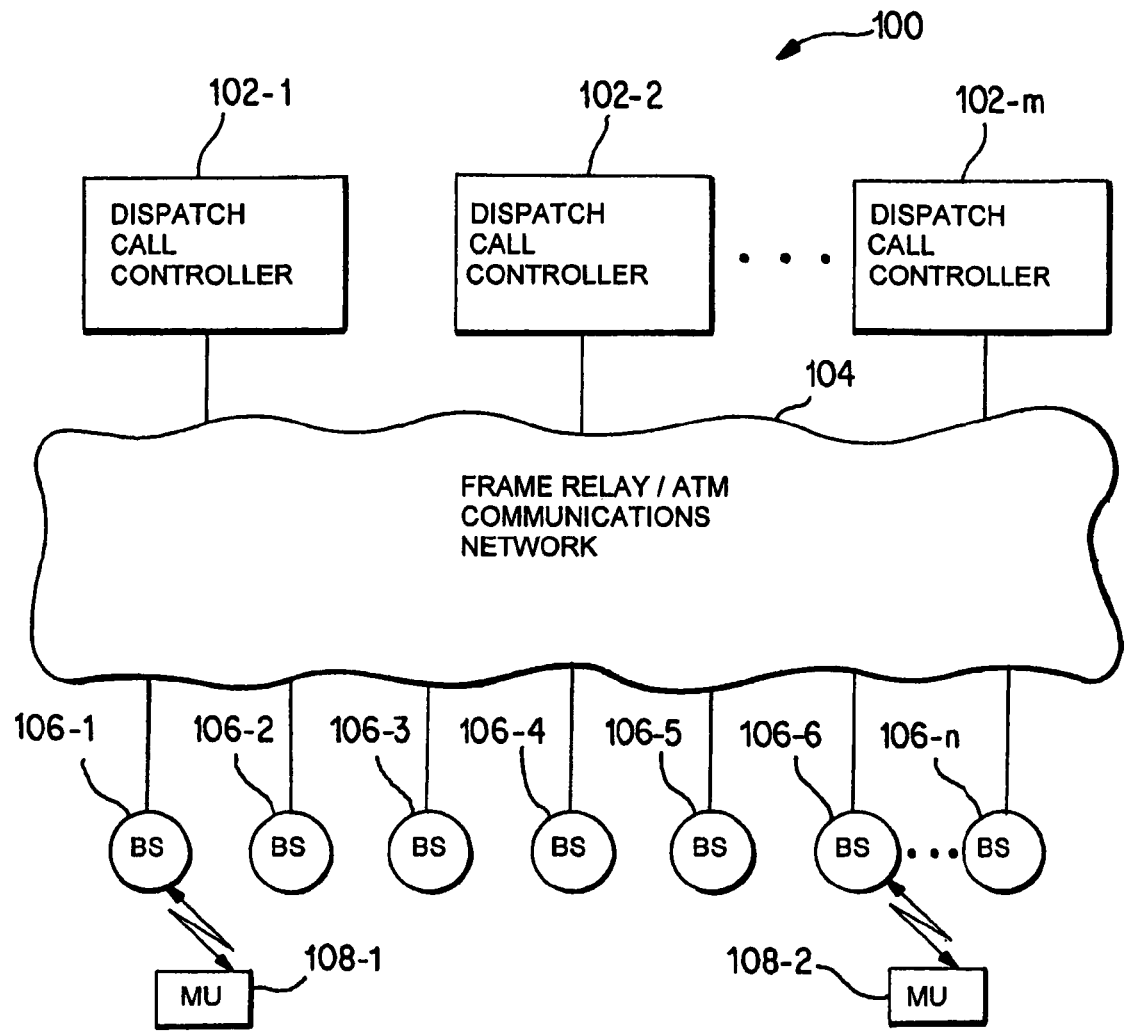
FIG. 1A illustrates a block diagram of a conventional wireless communication system.
Figure 1B:
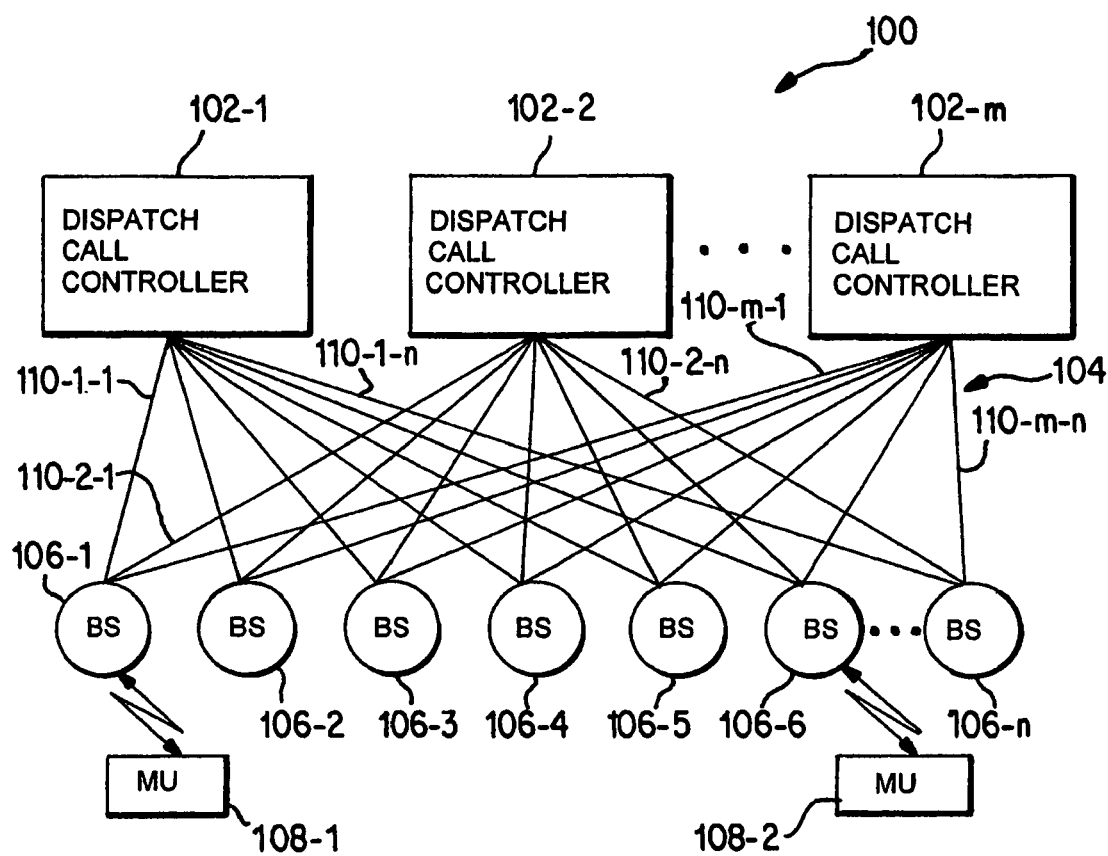
FIG. 1B illustrates a link diagram of the conventional wireless communication system.
Figure 2:
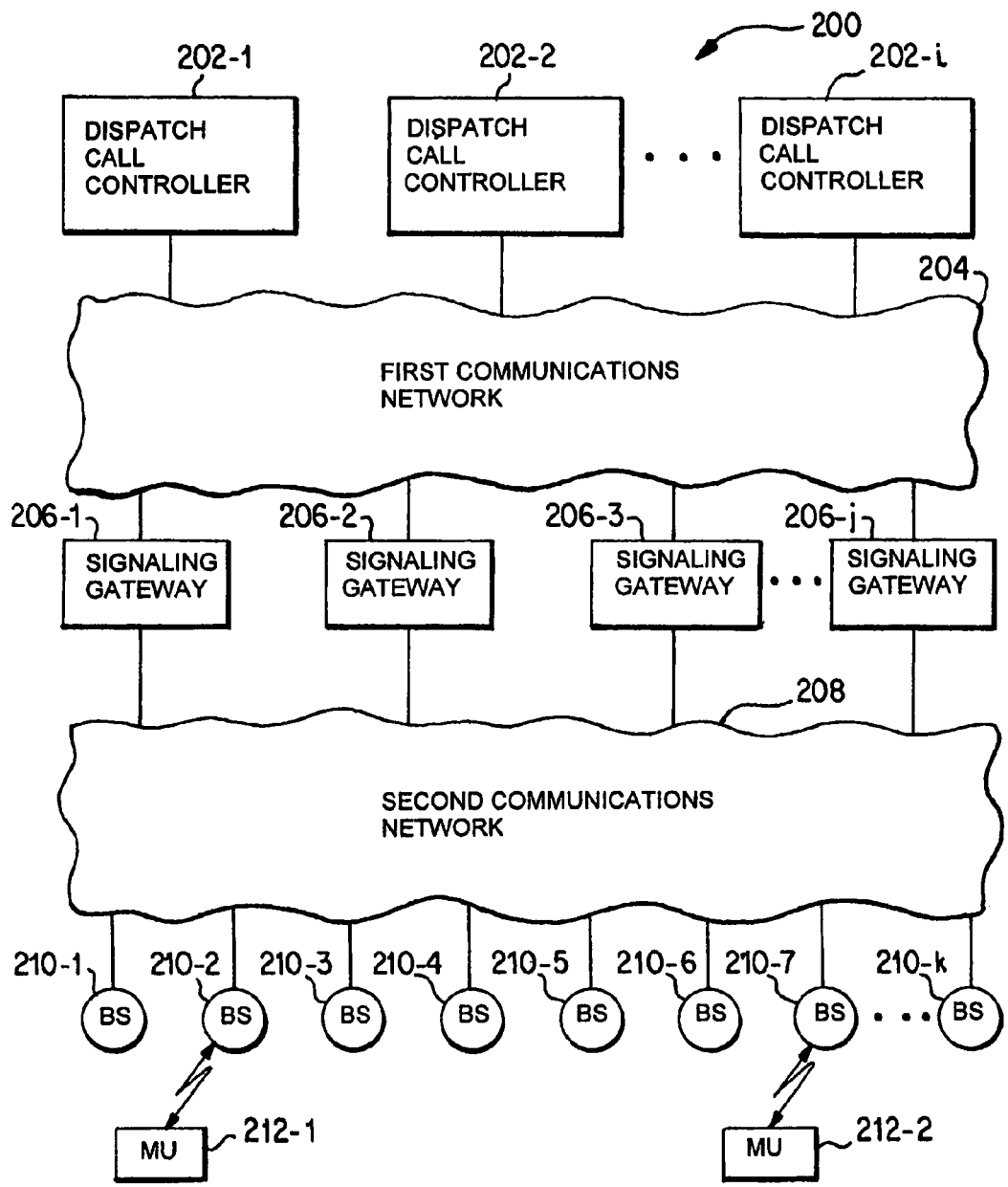
FIG. 2 illustrates a block diagram of an exemplary wireless communication system in accordance with an embodiment of the invention.

FIG. 2 illustrates a block diagram of an exemplary wireless communication system 200 in accordance with an embodiment of the invention. In summary, the wireless communication system 200 is characterized in having a signaling gateway serve as an intermediary between a dispatch call controller and a base station. The dispatch call controller may be coupled to the signaling gateway by way of a first communications network, which may be of the internet protocol (IP) type. The signaling gateway is coupled to the base station by way of a second communications network, which may be of a frame relay/asynchronous transfer mode (ATM) type.

The wireless communication system 200 may be configured, for example, to have 15 dispatch call controllers, 100 signaling gateways, and 3200 base stations. Each of the dispatch call controllers has logical links to each of the signaling gateways. Thus, in this example, each dispatch call controller manages only 100 logical links. Each of the signaling gateways has logical links to a distinct set of 32 base stations. Thus, the total number of logical links for the wireless communication system 200 is 4700 (1500(15 dispatch call controllers×100 signaling gateways) plus 3200 (100 signaling gateways×32 base stations per gateway)). Accordingly, the number of logical links 4700 in the wireless communication system 200 is substantially less than the 48,000 logical links in the prior art wireless communication system 100. The significant reduction in logical links results in numerous advantages for the wireless communication system 200 as further detailed below.

More specifically, the wireless communication system 200 comprises a plurality of dispatch call controllers 202-1 through 202-$i$, a first communications network 204, a plurality of signaling gateways 206-1 through 206-$j$, a second communications network 208, and a plurality of base stations 210-1 through 210-$k$. The dispatch call controllers 202-1 through 202-$i$ are coupled to the signaling gateways 206-1 through 206-$j$ by way of the first communications network 204. The signaling gateways 206-1 through 206-$j$ are coupled the base stations 210-1 through 210-$k$ by way of the second communications network 208. The wireless communication system 200 provides dispatch communication services to a plurality of mobile communications units (MUs) (e.g., wireless handsets), two of which are shown as MUs 212-1 and 212-2 assigned respectively to base stations 210-2 and 210-7.

The dispatch call controllers 202-1 through 202-$i$ set up dispatch communication links between two or more entities, control the allocation of respective channel floors of the dispatch communication links, and terminates the dispatch communication links. Also, the dispatch call controllers 202-1 through 202-$i$ manage the mobility of MUs between different base stations.

The first communications network 204 may be of any type, including frame relay, ATM, and IP. In this example, however, the first communications network 204 is of the IP protocol type. The second communications network 208 may also be of any type, including frame relay, ATM, and IP. In this example, however, the second communications network 208 is of the frame relay/ATM protocol type. The base stations provide an interface between the wireless environment in which the MUs reside, and the wired environment of the second communications network 208.

The signaling gateways 206-1 through 206-$j$ provide a signaling interface between the first communications network 204 and the second communications network 208. Accordingly, each signaling gateway translates messages received from a dispatch call controller and intended for a base station from the protocol of the first communications network 204 to the protocol of the second communications network 208. For example, if the protocol of the first communications network 204 is IP and the protocol of the second communications network 208 is frame relay/ATM, then the signaling gateway translates such messages from IP to frame relay/ATM. Similarly, each signaling gateway translates messages received from a base station and intended for a dispatch call controller from the protocol of the second communications network 208 to the protocol of the first communication network 204. For example, if the protocol of the first communications network 204 is IP and the protocol of the second communications network 208 is frame relay/ATM, then the signaling gateway translates such messages from frame relay/ATM to IP.

As discussed in more detail in the Background section, the messages mention in the prior paragraph may relate to the setting up of dispatch communication links, controlling respective channel floors of the dispatch communication links, and terminating the dispatch communication links. In addition, these messages may also relate to the management of the mobility of MUs between different base stations.

In addition to serving as an interface between the first and second communications networks 204 and 208, the signaling gateways 206-1 through 206-$j$ may also perform the function of a media server, or voice packet duplicator. For example, if the dispatch communication link couples together three or more parties (e.g., a group call), then the involved signaling gateway duplicates the voice packets from the transmitting party for sending to the receiving parties.

The following describes how the wireless communication system 200 type simplifies the link management for the dispatch call controllers as compared to the prior art wireless communication system 100.

Figure 3:
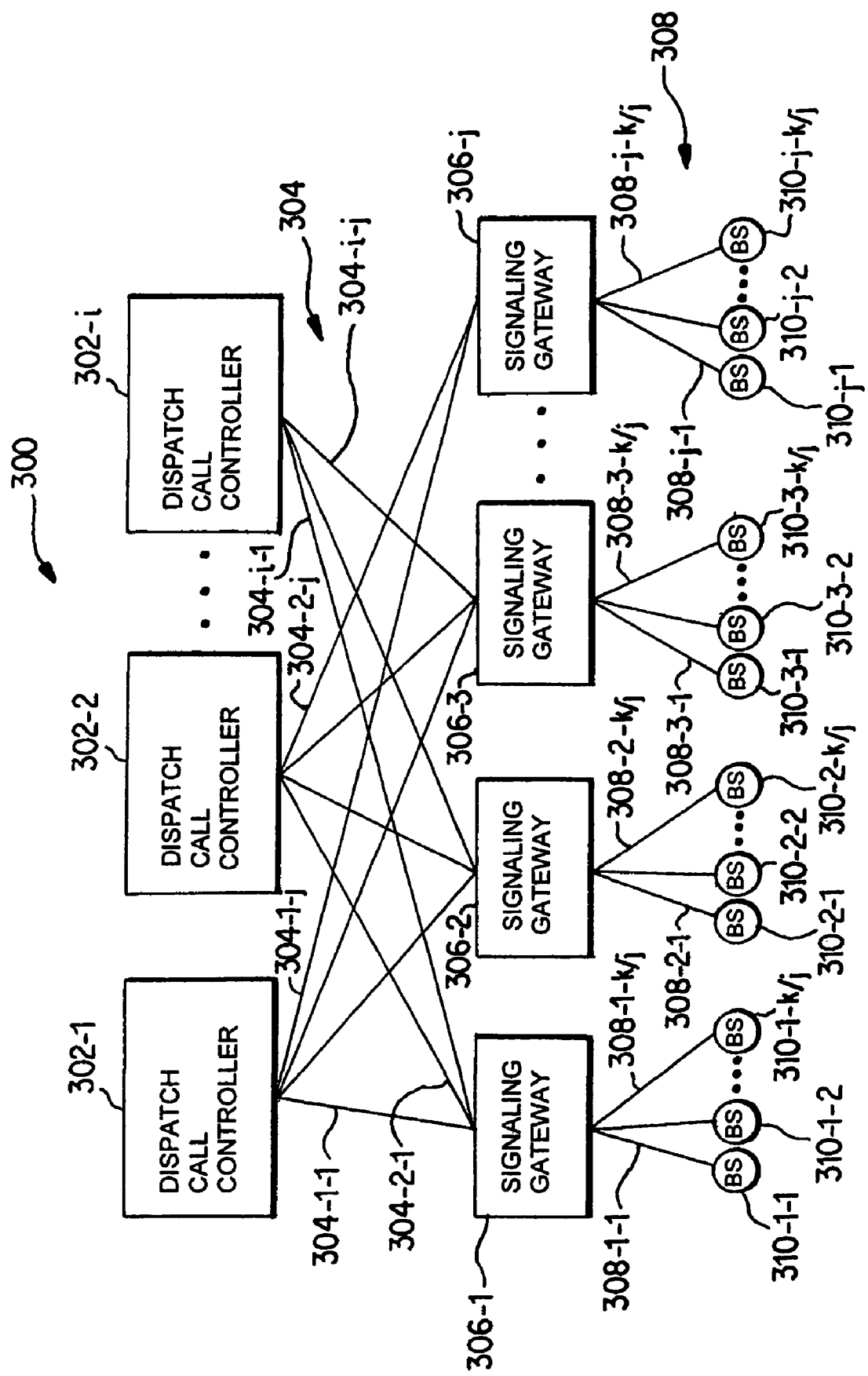
FIG. 3 illustrates a link diagram of the exemplary wireless communication system in accordance with another embodiment of the invention.

FIG. 3 illustrates a link diagram of an exemplary wireless communication system 300 in accordance with another embodiment of the invention. The wireless communication system 300 is a more specific implementation of the wireless communication system 200. In particular, the wireless communication system 300 comprises a plurality of dispatch call controllers 302-1 through 302-$i$, an IP communications network 304, a plurality of signaling gateways 306-1 through 306-$j$, a frame relay/ATM communications network 308, and a plurality of base stations 310-1-1 through 310-$j$-$k/j$. In this example, the integer i represents the number of dispatch call controllers in the wireless communication system 300, the integer j represents the number of signaling gateways in the wireless communication system 300, and the integer k represents the number of base stations in the wireless communication system 300.

In this example, the IP communications network 304 provides each dispatch call controller logical links to each of the signaling gateways. For example, dispatch call controller 302-1 is coupled to signaling gateways 306-1 through 306-$j$ by way of respective logical links 304-1-1 through 304-1-$j$. Similarly, dispatch call controller 302-2 is coupled to signaling gateways 306-1 through 306-$j$ by way of respective logical links 304-2-1 through 304-2-$j$. And likewise, dispatch call controller 302-$i$ is coupled to signaling gateways 306-1 through 306-$j$ by way of respective logical links 304-$i$-1 through 304-$i$-$j$.

Also, in this example, the frame relay/ATM communications network 308 provides each of the signaling gateways logical links to a distinct set of base stations. For example, signaling gateway 306-1 is coupled to base stations 310-1-1 through 310-1-$k/j$ by way of respective logical links 308-1-1 through 308-1-$k/j$. Similarly, signaling gateway 306-2 is coupled to base stations 310-2-1 through 310-2-$k/j$ by way of respective logical links 308-2-1 through 308-2-$k/j$. And likewise, signaling gateway 302-$j$ is coupled to base stations 310-$j$-1 through 310-$j$-$k/j$ by way of respective logical links 308-$j$-1 through 308-$j$-$k/j$. Accordingly, each signaling gateway is coupled to k/j number of base stations.

Comparing the wireless communication system 300 to that of the prior art wireless communication system 100, it is readily apparent that the link management is substantially simplified in the wireless communication system 300. Assuming 15 dispatch call controllers and 3200 base stations for the prior art wireless communication system 100, the number of logical links to be managed is 48,000 (i.e., 15 dispatch call controllers×3200 base stations). Assuming the same number of dispatch call controllers and base stations for the wireless communication system 300, and further assuming 100 signaling gateways, the number of logical links to be managed is 4700 (i.e., 15 dispatch call controllers×100 signaling gateways plus 100 signaling gateways×32 base stations per each signaling gateway).

The significantly less logical links to manage in the wireless communication system 300 results in several advantages for the system. First, there is a significantly less number of logical links to manage by the dispatch call controllers. This frees up more processing power of the dispatch call controllers for performing other functions, such as processing more dispatch communications calls and/or managing the mobility of more MUs.

Another advantage of the wireless communication system 300 over the prior art wireless communication 100 is apparent when a network outage occurs resulting in a base station losing connectivity to a dispatch call controller. In the prior art wireless communication system 100, a network outage causes the affected dispatch call controller to continuously attempt to re-establish connectivity to the base station. The continuous attempt to re-establish connectivity to the base station adds to the utilization of the processing power of the affected dispatch call controller. Whereas in the new wireless communication system 300, the same network outage would not require the affected dispatch call controller to re-establish connectivity to the base station, thereby also freeing up more of the processing power of the dispatch call controller.

Yet another advantage of the new wireless communication system 300 over the prior art wireless communication system 100 is that the new system 300 is easier to troubleshoot. This is because there are 48,000 logical links in the prior art wireless communication system 100 as oppose to only 4700 logical links in the new wireless communication system 300. Less logical links typically result in easier troubleshooting.

Still another advantage of the wireless communication system 300 over the prior art wireless communication system 100 is that a dispatch call controller may be able to handle higher number of base stations as a result of its processing power being more available.

Figures 4A, 4B:
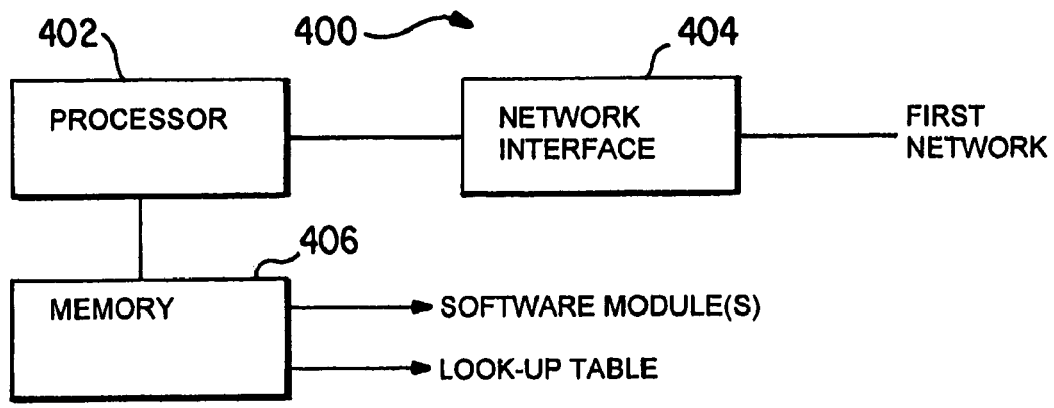
FIG. 4A illustrates a block diagram of an exemplary dispatch call controller in accordance with another embodiment of the invention.
FIG. 4B illustrates a diagram of an exemplary look-up table used by the exemplary dispatch call controller in accordance with another embodiment of the invention.

FIG. 4A illustrates a block diagram of an exemplary dispatch call controller 400 in accordance with another embodiment of the invention. The dispatch call controller 400 comprises a processor 402, a network interface 404, and a memory 406. The processor 402 performs the various operations of the dispatch call controller 400, including generating the messages for setting up dispatch communication links, controlling the respective channel floors of the dispatch communication links, and terminating dispatch communication links. The processor 402 also generates the messages for managing the mobility of MUs between different base stations. The network interface 404 provides the dispatch call controller 400 an interface to the first communications network in order to receive messages therefrom and send messages thereto. The memory 406, serving generally as a computer readable medium, stores one or more software module(s) adapted to control the processor 402 in performing its various operations, and also stores a look-up table as discussed in more detail below.

FIG. 4B illustrates a diagram of an exemplary look-up table 410 used by the exemplary dispatch call controller 400 in accordance with another embodiment of the invention. In order for the dispatch call controller 400 to communicate with a desired base station, it should have certain information. For instance, it should know which signaling gateway to use to communicate with the desired base station. Also, it should know what software version is being used by the desired base station. And, it should know the status of the link between the desired base station and the corresponding signaling gateway. The look-up table 410, which may be stored in memory 406, may be used to facilitate the organization and access of this information.

In particular, the look-up table 410 may be organized into four columns and 3200 rows; one row for each base station. The first column labeled "base station" may include information related to the identities of the base stations (e.g., 0001 through 3200). The second column labeled "signaling gateway" may include information related to the identities of the signaling gateways (e.g., 001 through 100) corresponding to the base stations in the same rows. The third column labeled "version" may include information related to the software version used by the base stations in the same rows. And, the fourth column labeled "status" may include information related to the status of the links between the signaling gateways and base stations in the same rows. The link status information may be provided to the dispatch call controller 400 by the corresponding signaling gateways. According to the exemplary look-up table 410, base station 0001 is coupled to signaling gateway 001, uses software version 2.0, and has an active link to the signaling gateway 001; and base station 3200 is coupled to signaling gateway 100, uses software version 3.0, and has an inactive link to the signaling gateway 100.

Figure 4C:
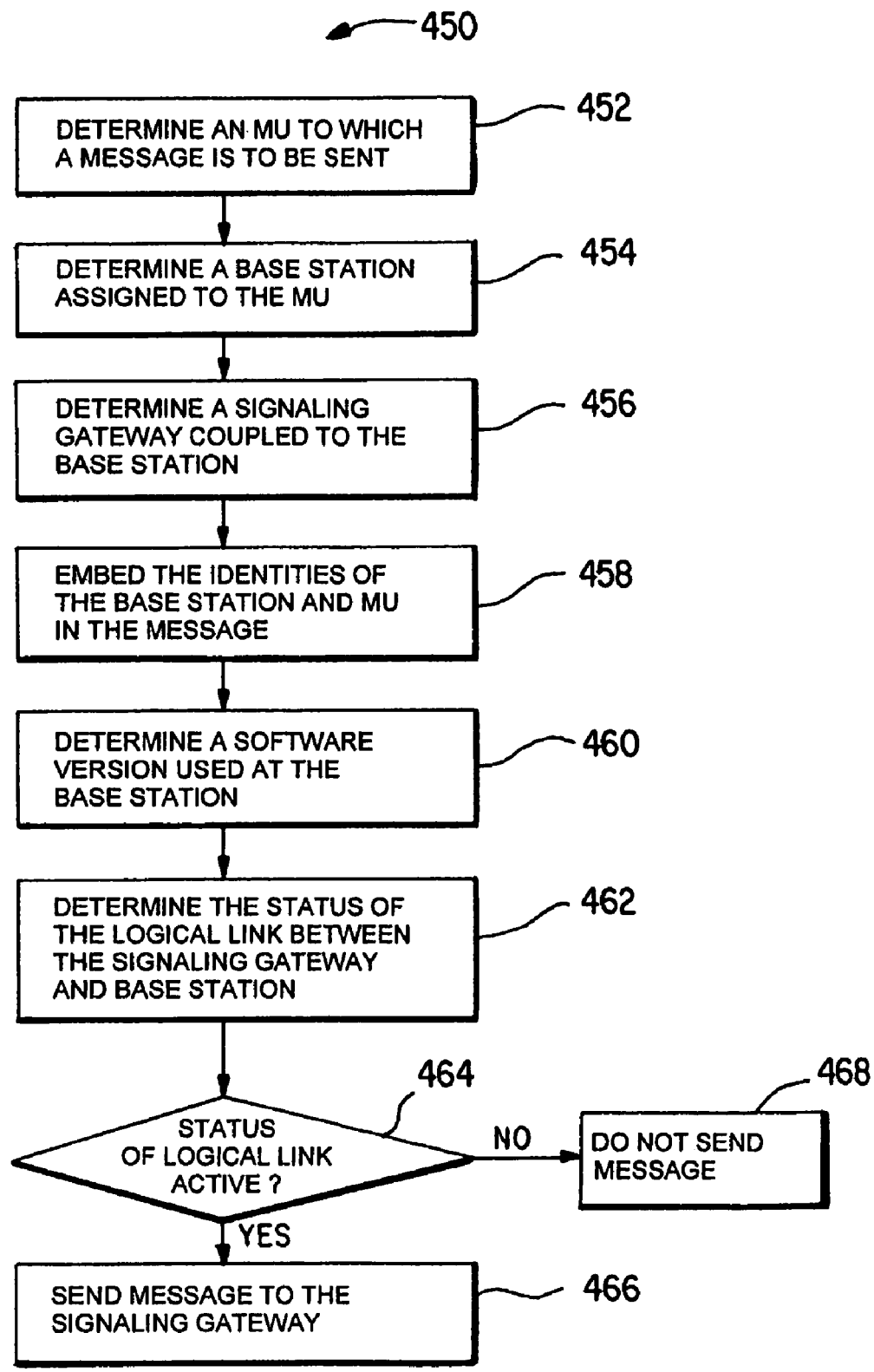
FIG. 4C illustrates a flow diagram of an exemplary method of sending a message by a dispatch call controller to an MU or base station in accordance with another embodiment of the invention.

FIG. 4C illustrates a flow diagram of an exemplary method 450 of sending a message by a dispatch call controller to an MU or base station in accordance with another embodiment of the invention. Since in the wireless communication systems 200 and 300, a dispatch call controller does not send a message directly to a base station, but instead indirectly by way of a signaling gateway, the method 450 of sending a message by the dispatch call controller to a base station is different than that of the prior art wireless communication system 100.

In particular, the method 450 entails the processor 402 determining which MU to send a message (block 452). Then, the processor 402 determines which base station is assigned to the MU (block 454). The processor 402 may obtain this information by sending a query to an HLR and/or a VLR. Once the processor 402 has the identity of the MU and assigned base station, the processor 402 then determines which signaling gateway to use to communicate with the base station (block 456). The processor 402 may perform this by accessing the look-up table 410 stored in the memory 406. Then the processor 402 embeds the identities of the base station and MU in the payload or header portion of the packet carrying the message (block 458).

The processor 402 then determines the software version used by the selected base station (block 460). The processor 402 also determines the status of the logical link to the selected base station (block 462). The processor 402 may perform the operations of blocks 460 and 462 by accessing the look-up table 410 stored in the memory 406. If the processor determines that the status of the logical link to the selected base station is not active (block 464), the processor 464 does not send the message (block 468). If, on the other hand, the processor 402 determines that the status of the logical link to the selected base station is active (block 464), the processor sends the packet containing the message to the signaling gateway by way of the network interface 404 (block 466).

Figure 5A:
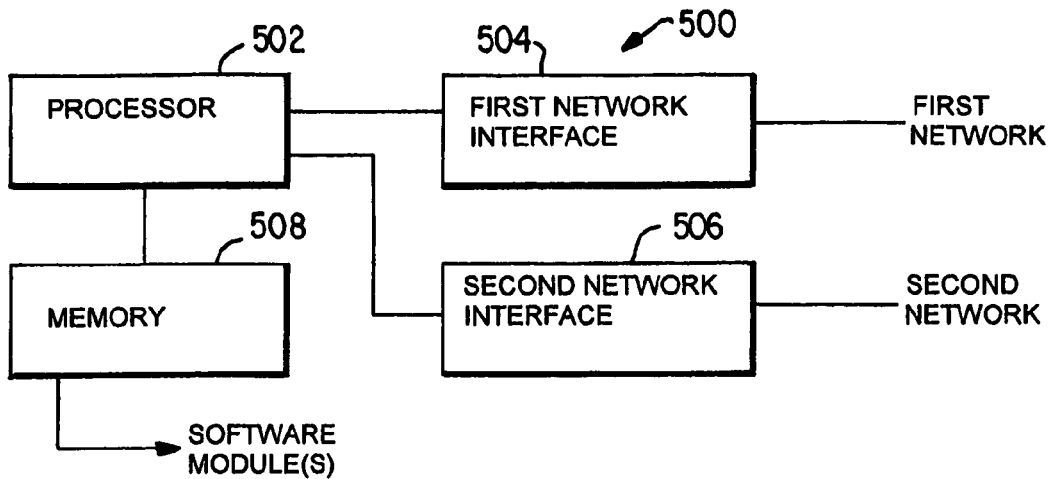
FIG. 5A illustrates a block diagram of an exemplary signaling gateway in accordance with another embodiment of the invention.

FIG. 5A illustrates a block diagram of an exemplary signaling gateway 500 in accordance with another embodiment of the invention. The signaling gateway 500 comprises a processor 502, a first network interface 504, a second network interface 506, and a memory 508. The processor 502 performs the various operations of the signaling gateway 500, including those described with reference to FIGS. 5B-5E. The first network interface 504 provides the signaling gateway 500 an interface to the first communications network in order to receive messages therefrom and send messages thereto. The second network interface 506 provides the signaling gateway 500 an interface to the second communications network in order to receive messages therefrom and send messages thereto. The memory 508, serving generally as a computer readable medium, stores one or more software module(s) adapted to control the processor 502 in performing its various operations, four of which are discussed below.

Figures 5B, 5C:
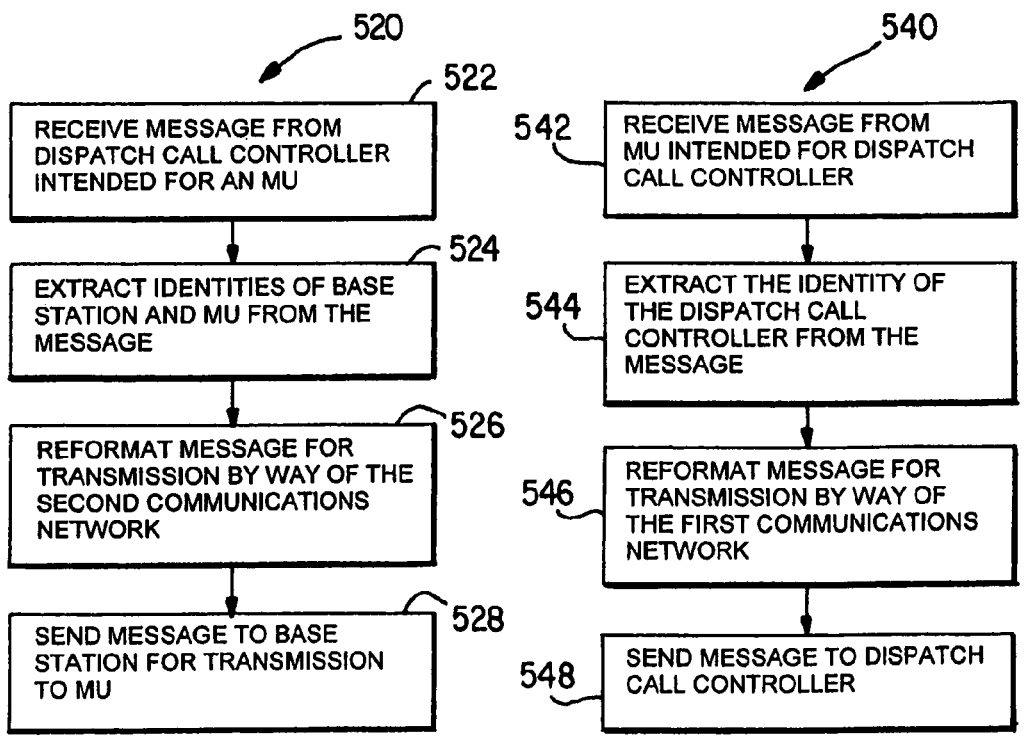
FIG. 5B illustrates a flow diagram of an exemplary method of relaying a message from a dispatch call controller to an MU or base station in accordance with another embodiment of the invention.
FIG. 5C illustrates a flow diagram of an exemplary method of relaying a message from an MU or base station to a dispatch call controller in accordance with another embodiment of the invention.

FIG. 5B illustrates a flow diagram of an exemplary method 520 of relaying a message from a dispatch call controller to an MU or base station in accordance with another embodiment of the invention. According to the method 520, the processor 502 receives a message intended for an MU from a dispatch call controller by way of the first network interface 504 (block 522). The processor 502 then extracts the identities of the base station and MU from the message (block 524). The processor 502 then re-formats the message appropriate for transmission by way of the second communications network (block 526). Then, the processor 502 sends the message to the base station by way of the second network interface 506 (block 528).

FIG. 5C illustrates a flow diagram of an exemplary method 540 of relaying a message from an MU or base station to a dispatch call controller in accordance with another embodiment of the invention. According to the method 540, the processor 502 receives a message intended for a dispatch call controller from an MU by way of the second network interface 506 (block 542). The processor 502 then extracts the identity of the dispatch call controller from the message (block 544). The processor 502 then re-formats the message for transmission by way of the first communications network (block 546). Then, the processor 502 sends the message to the dispatch call controller by way of the first network interface 504 (block 548).

Figure 5D:
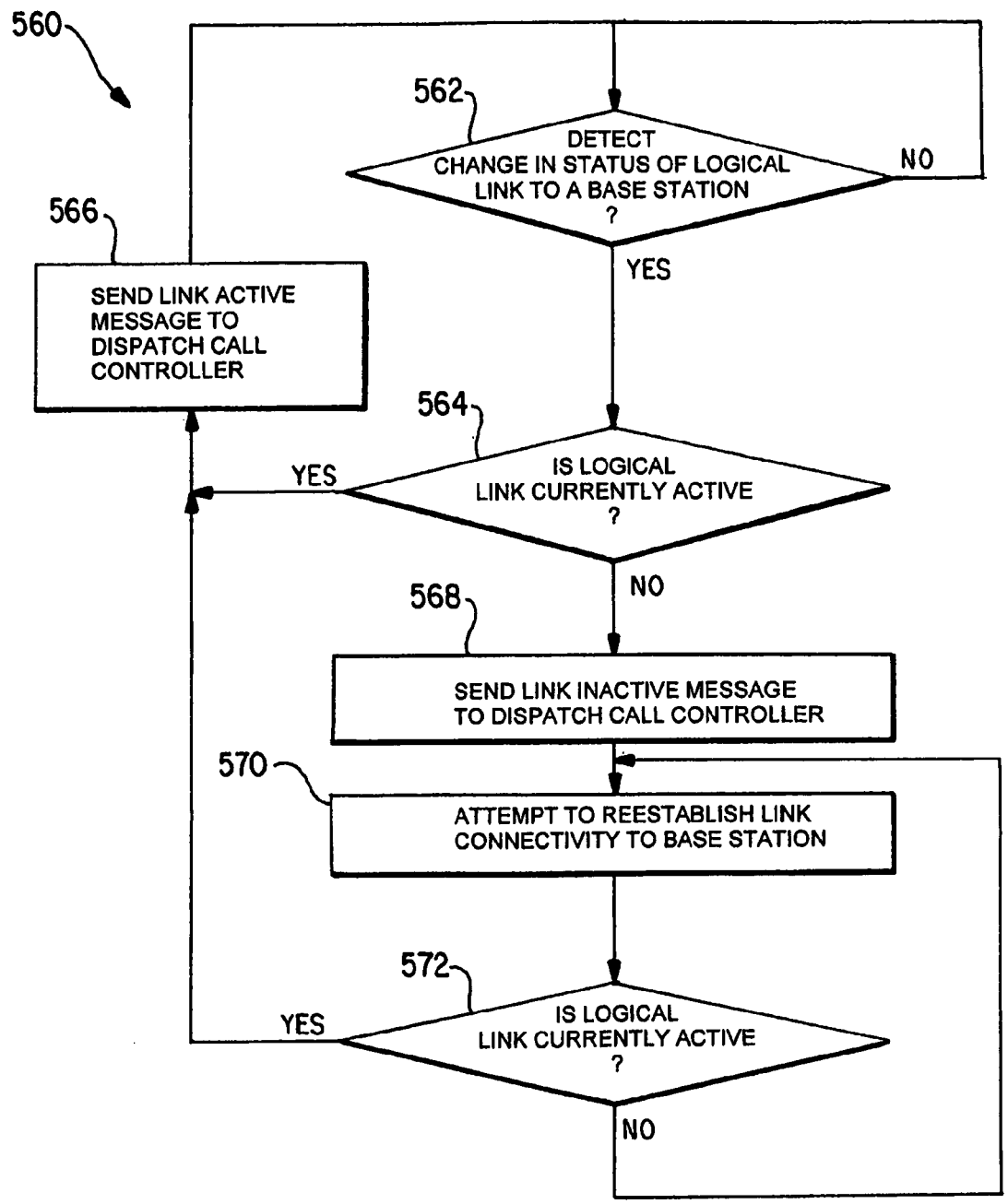
FIG. 5D illustrates a flow diagram of an exemplary method of informing a dispatch call controller of the status of a logical link to a base station in accordance with another embodiment of the invention.

FIG. 5D illustrates a flow diagram of an exemplary method 560 of informing a dispatch call controller of the status of a logical link to a base station in accordance with another embodiment of the invention. According to the method 560, the processor 502 monitors the status of the logical link to the base station to determine a change in the status (block 562). If the processor 502 does not detect a change in the status of the logical link to the base station, the processor 502 continuous to monitor for a status change (block 562). If, on the other hand, the processor 502 detects a change in the status of the logical link to the base station, the processor 502 then determines whether the logical link is currently active (block 564).

If the processor 502 determines that the logical link to the base station is currently active, the processor 502 sends a message indicating the active status of the logical link to the dispatch call controller by way of the first network interface 504 (block 566). If, on the other hand, the processor 502 determines that the logical link to the base station is inactive, the processor 502 sends a message indicating the inactive status of the logical link to the dispatch call controller by way of the first network interface 504 (block 568). In response to the logical link to the base station becoming inactive, the processor 502 then attempts to re-establish link connectivity to the base station (block 570).

After the processor 502 attempts to re-establish link connectivity to the base station, the processor 502 determines whether the logical link is currently active (block 572). If the logical link to the base station has not become active, the processor 502 again attempts to re-establish link connectivity to the base station (block 570). The processor 502 repeats the operations of blocks 570 and 572 until the logical link to the base station becomes active. If, in block 572, the processor 502 determines that the logical link to the base station is active, the processor 502 sends a message indicating the active status of the logical link to the dispatch call controller by way of the first network interface 504 (block 566). The processor 502 then returns to monitoring the status of the logical link to the base station (block 562).

Figure 5E:
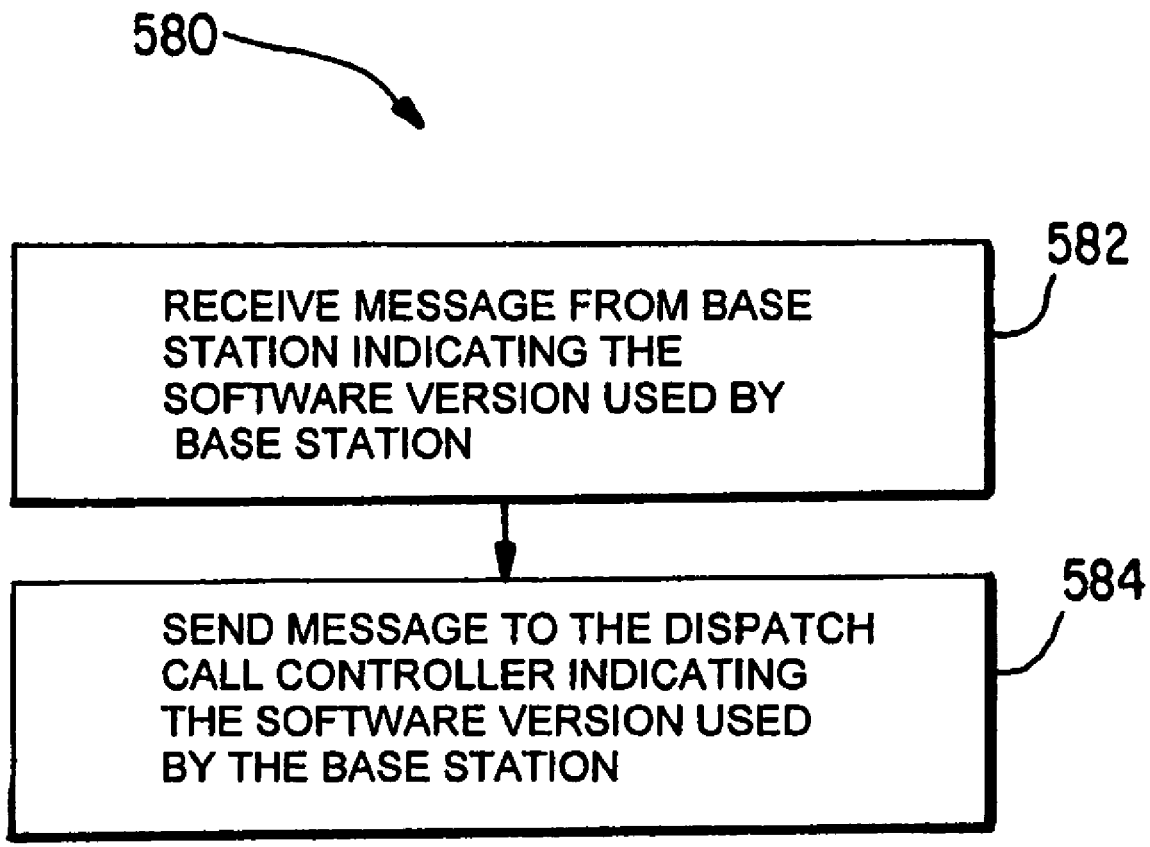
FIG. 5E illustrates a flow diagram of an exemplary method of informing a dispatch call controller of the software version used by a base station in performing, its operations in accordance with another embodiment of the invention.

FIG. 5E illustrates a flow diagram of an exemplary method 580 of informing a dispatch call controller of the software version used by a base station in performing its operations, in accordance with another embodiment of the invention. According to the method 580, the processor 502 receives a message from a base station by way of the second network interface 506, indicating the software version used by the base station in performing its operations (block 582). This message may be received automatically when the software used by the base station is updated, or it may be received in response to a query sent by the processor 502 to the base station. Once the processor 502 receives the message, the processor 502 sends the message to the dispatch call controller by way of the first network interface 504 (block 84).

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A dispatch call controller, comprising:
   a network interface;
   a memory for storing information related to software versions used respectively by a plurality of base stations; and
   a processor to:
      determine a mobile unit to which a message is to be sent;
      determine a selected base station among said plurality of base stations, assigned to communicate with said mobile unit;
      determine a selected signaling gateway among a plurality of signaling gateways, that communicates with said selected base station;
      access information related to the software version used by said selected base station from said memory; and
      send said message to said selected signaling gateway by way of said network interface, wherein said message is compliant with the software version used by said selected base station.

2. The dispatch call controller of claim 1, wherein said message includes information related to the identity of said mobile unit.

3. The dispatch call controller of claim 1, wherein said message includes information related to the identity of said selected base station.

4. The dispatch call controller of claim 1, wherein said message includes information related to the identity of said selected signaling gateway.

5. The dispatch call controller of claim 1, wherein said network interface is to couple to an internet protocol (IP) communications network.

6. The dispatch call controller of claim 1, wherein said processor is to determine said selected base station by querying a home location register (HLR) and/or a visitor location register (VLR).

7. The dispatch call controller of claim 1, further comprising a memory for storing information related to which of said signaling gateways are coupled to which of said base stations.

8. A method for a dispatch call controller, comprising:
   determining, by the dispatch call controller, a mobile unit to which a message is to be sent;
   determining, by the dispatch call controller, a selected base station among a plurality of base stations, assigned to communicate with said mobile unit;
   determining, by the dispatch call controller, a selected signaling gateway among a plurality of signaling gateways, assigned to communicate with said selected base station;
   determining, by the dispatch call controller, a software version used by said selected base station; and
   sending, by the dispatch call controller, said message to said selected signaling gateway, wherein said message is compliant with the software version used by said selected base station.

9. A computer readable medium including one or more software modules to control a processor of a dispatch call controller to:
   determine, by the processor of the dispatch call controller, a mobile unit to which a message is to be sent;
   determine, by the processor of the dispatch call controller, a selected base station among a plurality of base stations, assigned to communicate with said mobile unit;
   determine, by the processor of the dispatch call controller, a selected signaling gateway among a plurality of signaling gateways, assigned to communicate with said selected base station;
   determine, by the processor of the dispatch call controller, a software version used by said selected base station; and
   send, by the processor of the dispatch call controller, said message to said selected signaling gateway, wherein said message is compliant with the software version used by said selected base station.

10. A dispatch call controller, comprising:
    a network interface;
    a memory for storing information related to a status of respective logical links between a plurality of signaling gateways and said base stations; and
    a processor to:
       determine a mobile unit to which a message is to be sent;
       determine a selected base station among a plurality of base stations, assigned to communicate with said mobile unit;
       determine a selected signaling gateway among a plurality of signaling gateways, that communicates with said selected base station;
       access information related to the status of the logical link between said selected signaling gateway and said selected base station from said memory; and
       send said message to said selected signaling gateway by way of said network interface only if said status of the logical link between said selected signaling gateway and said selected base station is active.

11. A method for a dispatch call controller, comprising:
    determining, by the dispatch call controller, a mobile unit to which a message is to be sent;
    determining, by the dispatch call controller, a selected base station among a plurality of base stations, assigned to communicate with said mobile unit;
    determining, by the dispatch call controller, a selected signaling gateway among a plurality of signaling gateways, assigned to communicate with said selected base station;
    determining, by the dispatch call controller, a status of a logical link between said selected signaling gateway and said selected base station; and
    sending, by the dispatch call controller, said message to said selected signaling gateway only if said status of said logical link between said selected signaling gateway and said selected base station is active.

12. A computer readable medium including one or more software modules to control a processor of a dispatch call controller to:

determine, by the processor of the dispatch call controller, a mobile unit to which a message is to be sent;

determine, by the processor of the dispatch call controller, a selected base station among a plurality of base stations, assigned to communicate with said mobile unit;

determine, by the processor of the dispatch call controller, a selected signaling gateway among a plurality of signaling gateways, assigned to communicate with said selected base station;

determine, by the processor of the dispatch call controller, a status of a logical link between said selected signaling gateway and said selected base station; and send, by the processor of the dispatch call controller, said message to said selected signaling gateway only if said status of said logical link between said selected signaling gateway and said selected base station is active.

* * * * *